July 8, 1952   J. RAISING   2,602,250
VEGETABLE AND FLOWER MARKER
Filed Dec. 11, 1946
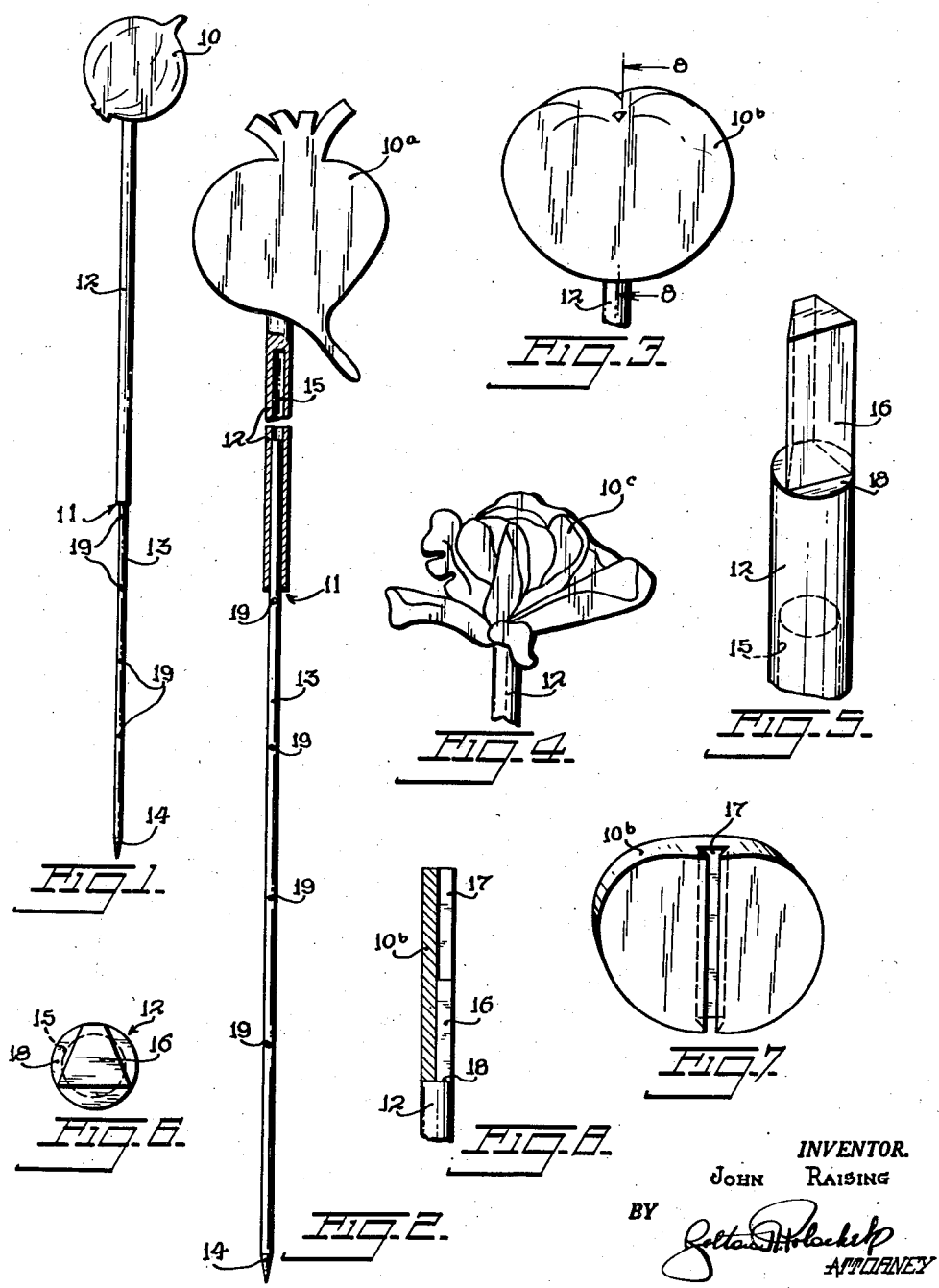
INVENTOR.
JOHN RAISING
BY
ATTORNEY Patented July 8, 1952

2,602,250

UNITED STATES PATENT OFFICE 2,602,250

VEGETABLE AND FLOWER MARKER

John Raising, Richmond Hill, N. Y.

Application December 11, 1946, Serial No. 715,517

1 Claim. (Cl. 40—10)

This invention relates to aids for the gardener, and more particularly aims to provide a novel and valuable garden ground-marker for vegetable and flower plantings.

Heretofore markers have been used, especially by amateur or non-professional flower and vegetable growers, to identify the first seedlings and maintain identification of these while growing for attainment of their characteristic heights.

However, a feature of the present invention is the provision of an artistically pleasing indicator-member for designating the particular plant to be identified, and yet a marker which is inexpensive to make, which may be of substantially inconsiderable bulk cross sectionally, and which, at the same time is a marker the significance of which can be visually noted at a considerable distance, as is not the case with markers having printed or written references thereon to the plant to be identified.

Another feature of the invention is a construction of a marker and its ground-piercing support, the latter preferably of the staff type, having new and exceedingly useful capabilities, yet a construction throughout which may satisfactorily be provided without the preparatory making of expensive dies for stamping out special metal parts, and even without the necessity of employing metal at all. In this last connection, the marker of the present invention is ideally adapted to be made from such low cost materials such as wood or plastic parts, rods for the staves, and mere plate-like indicators when desired.

An object of the invention is to provide, furthermore, an indicator which is readily, and at will, positionable at a variable elevation above the ground, as for instance, to have its representation displayed always at an optimum height in front of or above the plant as the latter varies in height during growth.

Still another object is to provide a combined indicator and supporting staff as a knock-down combination of parts, and wherein an indicator for one plant may be readily substituted on a staff for the indicator for another plant, and vice versa.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 shows a now preferred embodiment, in front elevation.

Fig. 2 is a similar view, but on an enlarged scale, with parts broken away, and with the indicator representative of a beet instead of an onion as in Fig. 1.

Fig. 3 is a fragmentary front elevation, showing, by way of another example, an indicator representative of a tomato.

Fig. 4 is a view similar to Fig. 3 but with the indicator representative of a flower.

Fig. 5 is a perspective view, showing on an enlarged scale the upper end of the staff.

Fig. 6 is a top plan view of the staff.

Fig. 7 is a rear perspective of the indicator of Fig. 3.

Fig. 8 is a section taken on the line 8—8 of Fig. 3.

The garden marker, according to the present invention, includes an indicator 10, Fig. 1, in the form of an onion; an indicator 10a, Fig. 2, in the form of a beet; an indicator 10b, Fig. 3, in the form of a tomato; or an indicator 10c, Fig. 4, in the form of a flower. Each indicator is preferably a sheet member, jig-sawn, molded, stamped, or otherwise shaped to any suitable outline, such as square, oblong, circular, oval or if desired and as is now preferred, to the exact outline of the graphic representation carried by it of the fruit or blossom of a particular plant.

Desirably, the front side of the indicator carries its representation of the fruit or flower of the plant to be marked, in a way which is unmistakably recognizable, preferably in natural color and with such representation extending to the very bounds of the indicator, so that the outline of the fruit or flower is defined by the outline of the indicator; or the representation may be placed on an indicator of some more geometrical outline as already stated.

As the staff may be embodied according to the concept of the invention that a staff of variable length be included, the staff, marked generally 11, comprises two telescoping sections 12 and 13; the upper one 12 being the sleeving member, and the lower one 13, which is the sleeved member, being preferably sharpened at its lower end as at 14 to provide a ground-piercing spike.

The upper staff part 12, having an upwardly extending bore 15 for reception of the upper portion of the lower staff part 13, is shaped at its top to interlock with a suitable recess in the rear portion of an indicator. Such interlock is desirable, to prevent unintended turning of the indicator on the staff about the axis of the latter. While an interlock is shown in which a male member thereof is carried at the upper end of the staff part 12 for reception in a recess in an indicator, these respective elements of the interlock may be reversed; that is, a suitable projection may be carried by the indicator, as at the back thereof, to be slipped downwardly keyingly into a matching recess in the staff part 12 near its upper end, as will be understood.

The preferred interlock is one in which a keying means against rotation of the indicator on the staff is a dove-tail projection on one of the two parts of the indicator and staff, this projection for slidable insertion into and removable from a receiving cavity of dove-tail cross section. Here, such a dove-tail projection 16, is shown on the top of the staff part 12. The accommodating recess at the back of the indicator is here shown as a vertically extending slot or groove 17 such as may be easily molded, or as easily cut by a standard woodworking power-tool. The groove referred to is illustrated in connection with the indicator 10$^b$ of Fig. 3, and as is shown in Figs. 7 and 8.

A desired indicator, of the varieties as may be on hand or one especially purchased for a particular plant, is merely slipped downward by way of its groove corresponding to the groove 17, onto the dove-tail projection 16 at the top of staff part 12. With the staff cylindrical, as is preferred, such projection is preferably constituted as illustrated in Fig. 5, so as to provide a shoulder or ledge 18 of appreciable width diametrally of the upper staff part 12, to act as a stop means to limit downward movement of the indicator.

The staff parts 12 and 13, with the former telescoped over the latter, may be maintained against accidentally relative axial movement in any appropriate way, so as then to keep the indicator at the desired height above ground level, following piercing of the soil by the point 14 for adequately deep burial of a bottom length of staff part 13 in the ground. For instance, there may be somewhat of a snug fit of the lower staff part 13 within the upper staff part 12; or the former may have transverse holes 19 at intervals here shown as four in number, of a size to receive and frictionally hold a standard size brad (not shown); so that when the marker is first set up, such brad may be inserted into the lowermost hole 19, and then, as the plant increases in growth and height, the upper staff part 12 may be slid upward on the lower staff part 13, the brad may then be transferred to the next higher hole 19, and then the upper staff part may be allowed to drop onto the projecting end or ends of the brad; and so on.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

Means removably but non-rotatively mounting an indicator member on the top end of a staff which has its bottom end pressed into garden soil, comprising a projection continuing axially from the top end of the staff, said projection being of irregular horizontal cross-sectional shape forming shoulders at the top end of the staff, the indicator member having a vertical groove in its back face corresponding to the cross-sectional shape of said projection and opening through the bottom edge of the indicator, so constructed and arranged that the indicator member can be slipped down over the top end of said projection to rest on said shoulders.

JOHN RAISING.

REFERENCES CITED

The following references are of record in the file of this patent:

UNITED STATES PATENTS

| Number | Name | Date |
|---|---|---|
| 712,154 | Reineman | Oct. 28, 1902 |
| 1,164,996 | Davies | Dec. 21, 1915 |
| 1,490,341 | Olney | Apr. 15, 1924 |
| 1,545,391 | Boardman | July 7, 1925 |
| 1,597,573 | Blue | Aug. 24, 1926 |
| 1,616,147 | Smiley | Feb. 1, 1927 |
| 2,123,329 | Combs et al. | July 12, 1938 |
| 2,137,799 | Brandenburg | Nov. 22, 1938 |
| 2,167,564 | Fonda | July 25, 1939 |

FOREIGN PATENTS

| Number | Country | Date |
|---|---|---|
| 16,914 | Great Britain | Sept. 22, 1900 |